United States Patent [19]

Monnier

[11] 4,307,935
[45] Dec. 29, 1981

[54] COUPLING DEVICE BETWEEN OPTICAL FIBERS AND ELECTRO-OPTICAL ELEMENTS

[75] Inventor: Michel J. C. Monnier, Montgeron, France

[73] Assignee: U.S. Philips Corporation, New York, N.Y.

[21] Appl. No.: 89,797

[22] Filed: Oct. 31, 1979

[30] Foreign Application Priority Data

Nov. 2, 1978 [FR] France ............... 78 31029

[51] Int. Cl.³ ............................ G02B 5/14
[52] U.S. Cl. ...................... 350/96.20; 350/96.17
[58] Field of Search ............. 350/96.20, 96.17; 250/227, 552; 357/17

[56] References Cited

U.S. PATENT DOCUMENTS

| | | | |
|---|---|---|---|
| 3,414,733 | 12/1968 | Wunderman | 350/96.20 |
| 3,423,594 | 1/1969 | Galopin | 350/96.20 |
| 3,859,536 | 1/1975 | Thiel | 250/552 |
| 3,987,300 | 10/1976 | Palmer | 250/227 |
| 4,101,197 | 7/1978 | Kent et al. | 250/227 |
| 4,136,351 | 1/1979 | Sugawara et al. | 357/17 |
| 4,186,995 | 2/1980 | Schumacher | 350/96.20 |
| 4,238,527 | 12/1980 | Monnier et al. | 427/55 |

FOREIGN PATENT DOCUMENTS

2320361  3/1977  France .

OTHER PUBLICATIONS

J. N. Stallard, "Stuffing of Optical Fibers" in *IBM Tech. Disc. Bulletin*, vol. 9, No. 11, Apr. 1967, p. 1581.
Cefarelli et al., "Optical Circuit Module Connector" in IBM Tech. Disc. Bulletin, vol. 21, No. 4, Sep. 1978.
"Le dossier industriel des fibres optiques et des opto-liaisons" Catier, Applications industrielles informatique, May 1978, pp. 27–37.

*Primary Examiner*—Stewart J. Levy
*Attorney, Agent, or Firm*—Jack E. Haken; Marc D. Schechter

[57] ABSTRACT

The invention relates to a coupler for connecting optical fibers and electro-optical elements by means of a flexible polyimide substrate which is provided with a hole for positioning the fiber. The substrate is also provided with small metallized holes, covered with a metal bump, for connection of the electro-optical element.

4 Claims, 4 Drawing Figures

COUPLING DEVICE BETWEEN OPTICAL FIBERS AND ELECTRO-OPTICAL ELEMENTS

BACKGROUND OF THE INVENTION

The invention relates to a coupling device comprising at least an optical fiber and an electro-optical element which are coupled by means of a connection element. Electro-optical element is to be understood to mean herein an electroluminescent diode, a laser diode, and generally all elements in which optical emission or reception is caused or facilitated by an electrical effect.

The invention may be applied in the field of optical transmission, more in particularly for the connection of transmitting and receiving elements by means of an optical fiber. Such connections are known from the prior art. See, for example, the article which was published in May 1978 in "Applications industrielles informatique" under the title "Le dossier industriel de fibres optiques et des opto-liaisons" by Eric Catier. In these usual connections, however, the mutual positioning of the fiber and the electro-optical element remains a major difficulty.

SUMMARY OF THE INVENTION

It is an object of the present invention to provide a coupling device in which the various elements may be connected together as soon as possible after it has been found out that their positions ensure an optimum light transfer.

According to the present invention, the coupling device comprises a connection element made of a polyimide substrate having a conical hole for the positioning of the optical fiber. At least one of the major surfaces of the connection element has a metal pattern which forms the electric supply lines for the electro-optical element. The optical fiber and the electro-optical element are situated on opposite sides of the connection element and holding means are present to secure them to the connection element.

According to a preferred embodiment of the invention the polyimide substrate has several holes the inner walls of which are metallized. An opening of each hole is covered with a metal bump to connect the electro-optical device.

In this manner the elements are positioned on the connection element according to their optical results. The assembly is heated sufficiently to cause the metal bumps to melt and to secure the elements.

BRIEF DESCRIPTION OF THE INVENTION

The invention will now be described in greater detail with reference to the accompanying drawing.

DESCRIPTION OF THE PREFERRED EMBODIMENTS

Figure 1:
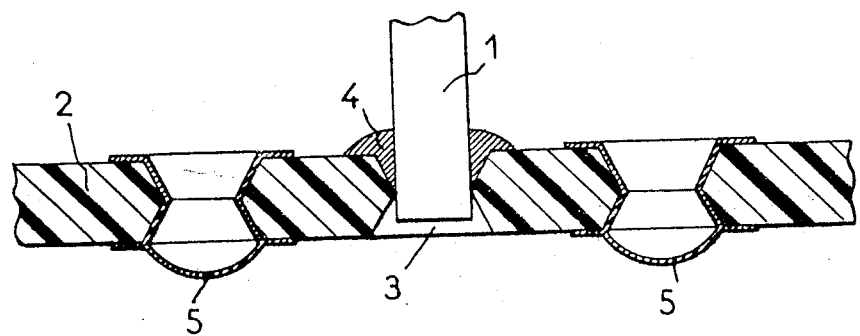
FIG. 1 is a cross-sectional view of a polyimide substrate in which an optical fiber has been arranged.

A coupling device to connect an optical fiber as shown in FIG. 1 and an electro-optical element is obtained by means of a flexible, polyimide substrate 2 which has a hole 3 which for the optical fiber 1. The usual dimensions of hole 3 are on the order of 50 to 150 microns. Hole 3 has internal conical surfaces such that the fiber is clamped therein. The inclination of the conical walls can be obtained by a chemical treatment on both sides of substrate 2 by means of an alkaline solution. The fiber can be held by means of an epoxy resin 4 which is provided on one side of the substrate, although in certain cases the clamping effect is already sufficient. If necessary the fiber can be connected to the substrate by means of tin solder. For this purpose the walls of the fiber must be coated with a thin layer of metal. Various other materials have been tested such as fluid Kapton (trademark), Araldite (trademark) provided with a filler, and Kapton (trademark) provided with silver as a filler. The best method of connecting the fiber seems to be Araldite (trademark) with a filler which polymerizes at 150° C. and which adheres perfectly without involving shrinkage of the fiber. The shape of the hole may have several variations. The holes may also be obtained chemically or thermally.

According to the invention means are provided for connecting an electro-optical element below the flexible, polyimide substrate. These means also assure an electric contact to the electro-optical element. These means are either in the form of a metallized ring (French Pat. No. 2,320,361), or in the form of glue with a metal which is compatible with the metal of the electro-optical element. Alternatively and preferably, these means comprise metal bumps 5 which cover the openings of a series of holes having metallized inner walls and being provided in a circle around the hole 3 for the fiber 1. These various holes the diameter of which is approximately 50 microns can be provided by means of an alkaline solution of potassium and of an alcohol, for example propanediol-2. The holes 5 can then be metallized as described in the above-mentioned Patent. The metal bumps are obtained at the openings of the holes as described in U.S. Pat. No. 4,238,527.

Figure 2:
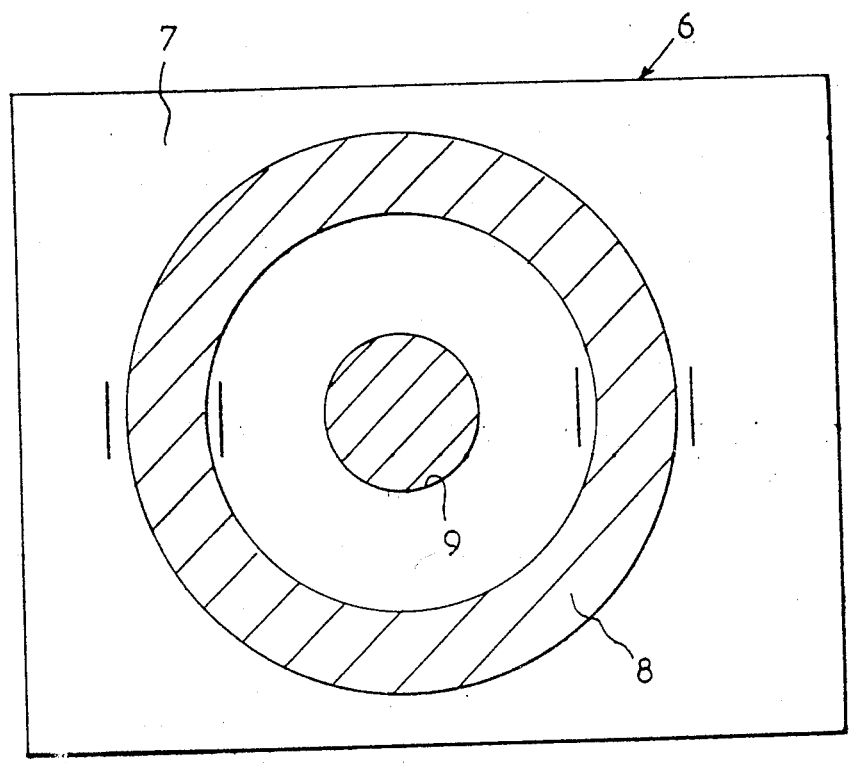
FIG. 2 is a plan view of an electro-optical element which is to be connected to the optical fiber.
Figure 3:
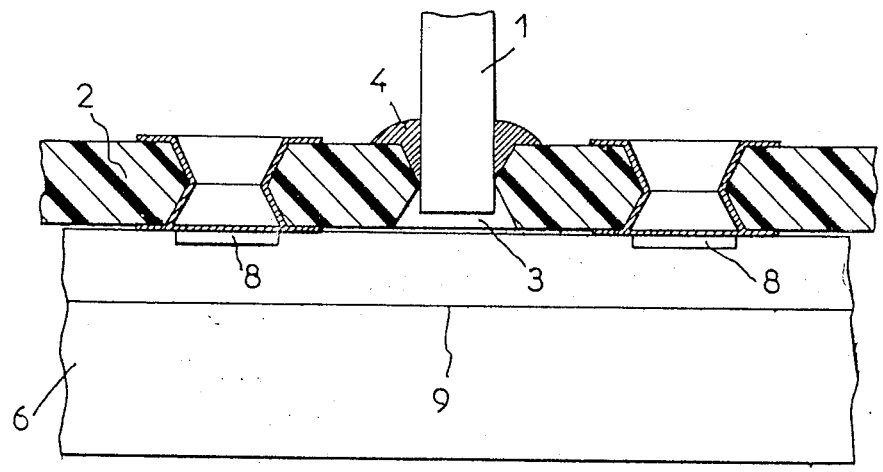
FIG. 3 shows, partly in cross-section, a connection as obtained by means of the present invention.

FIG. 2 is a plan view of an electro-optical element 6, for example, an electroluminescent diode. An electroluminescent diode consists of a very thin active region which is situated between two "dead" zones, one of the n-type and the other of the p-type. If, for example, an electroluminescent diode of GaAs is used, these diodes emit only light through the p-region of the crystal of which the thickness is very small, on the order of one micron. In that case the upper surface 7 is chosen as the external surface of the p-region. The contact electrode 8 is deposited in the form of a metal ring, for example of aluminum, so as to ensure an ohmic contact on the p-type region.

For an optimum positioning of the electro-optical element, for example an electroluminescent diode of GaAs, and the optical fiber which was previously inserted into the hole provided in the a, the emitter zone (active region) 9 of the electroluminescent diode is placed opposite to the fiber. At the other end of the fiber a light receiver is provided, for example an avalanche photodiode, which is connected to a bipolar amplifier.

During operation of the system the optimum position of the electroluminescent diode can be determined in a very accurate manner, since this has not yet been fixed. Electric power is supplied to the electroluminescent diode by contact between the electrode wreath on the upper surface of the diode and the metal bumps 5 on the orifices of the metallized holes of the polyimide substrate. When the desired position is obtained, heat is transmitted by means of infrared radiation, and the bumps are melted to cause soldering to the diode. The assembly is placed in a protective cap which is provided centrally with a hole for passing the optical fiber and also to hold it at a distance.

Figure 4:
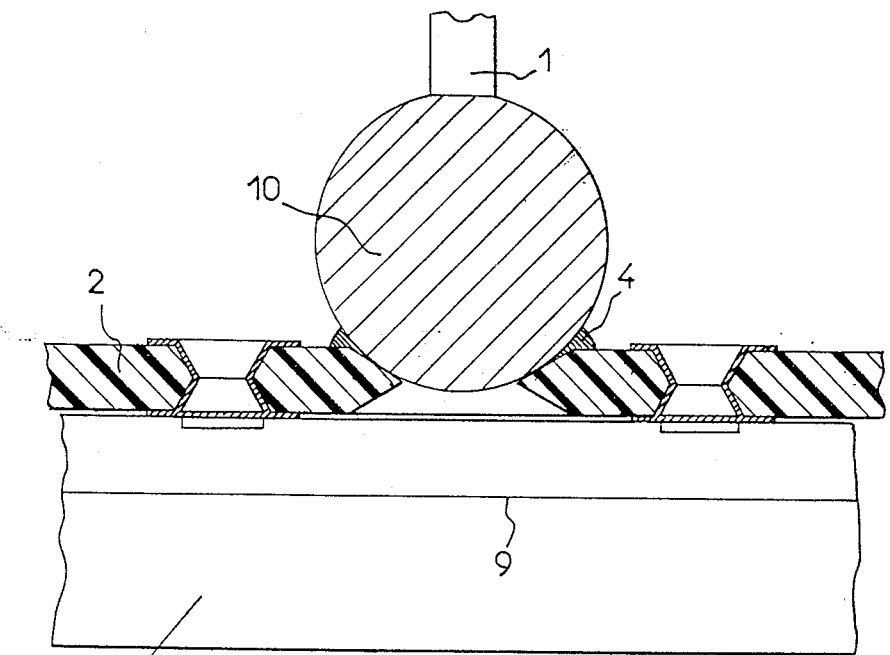
FIG. 4 shows, partly in cross-section, a modified embodiment of the connection.

According to a modified embodiment, the device may comprise an indexing adapter 10, for example a Weierstrasse ball or a hemi-spherical optical element provided near the emitter surface of the diode. This sphere can be secured in the large hole 3 which is provided in the polyimide substrate as is shown in FIG. 4. In this manner it is possible, in accordance with the dimensions of the sphere and the angle of inclination of the walls of the hole, to ensure the positioning of the sphere very accurately at a distance determined by the optical elements.

What is claimed is:

1. A coupling device, for coupling an optical fiber to an electro-optical element, comprising:
    a substantially flat connection element having a hole therethrough for accomodating an end of the optical fiber to be inserted in the hole via an opening on a first side of the connection element, said connection element having an electrically conductive pattern on a second side, opposite to the first side, for conducting electrical power to the electro-optical element;
    means for securing the optical fiber in the hole of the connection element; and
    means for securing the electro-optical element to the electrically conductive pattern on the second side of the connection element;
    characterized in that the substrate has at least one additional hole, the inner wall of which is metallized, said hole having an opening at the second side being covered with a metal bump, said electrically conductive pattern comprising the metal bump, and said means for securing the electro-optical element also comprising said metal bump.

2. A coupling device as claimed in claim 1, characterized in that the electrically conductive pattern is a metal pattern.

3. A coupling device as claimed in claim 2, characterized in that the means for securing the optical fiber in the hole of the connection element comprises internal conical surfaces in the hole for accomodating the end of the optical fiber.

4. A coupling device as claimed in claim 3, characterized in that the means for securing the electro-optical element comprise glue provided with metal.

* * * * *